Figure 1:
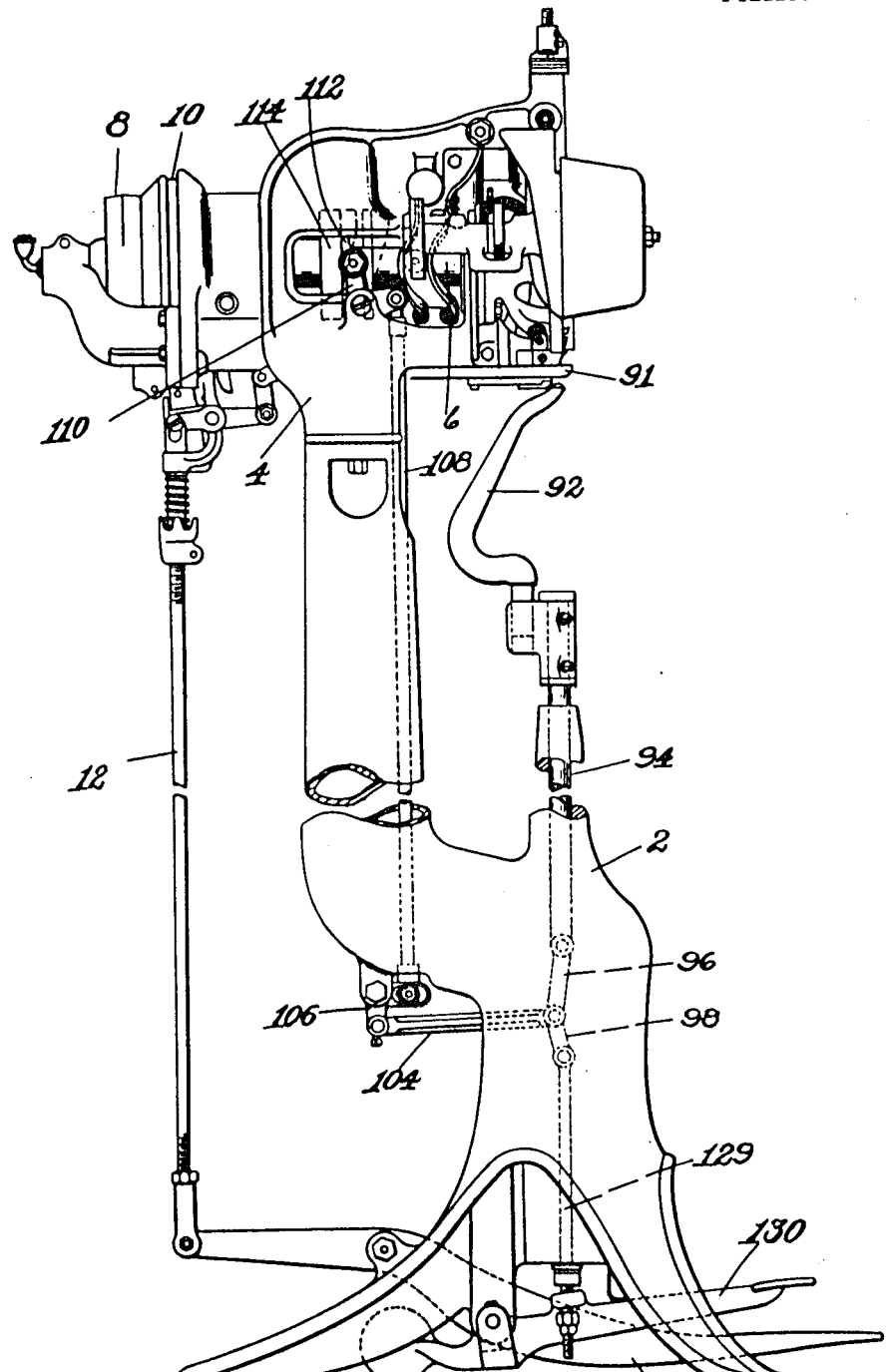

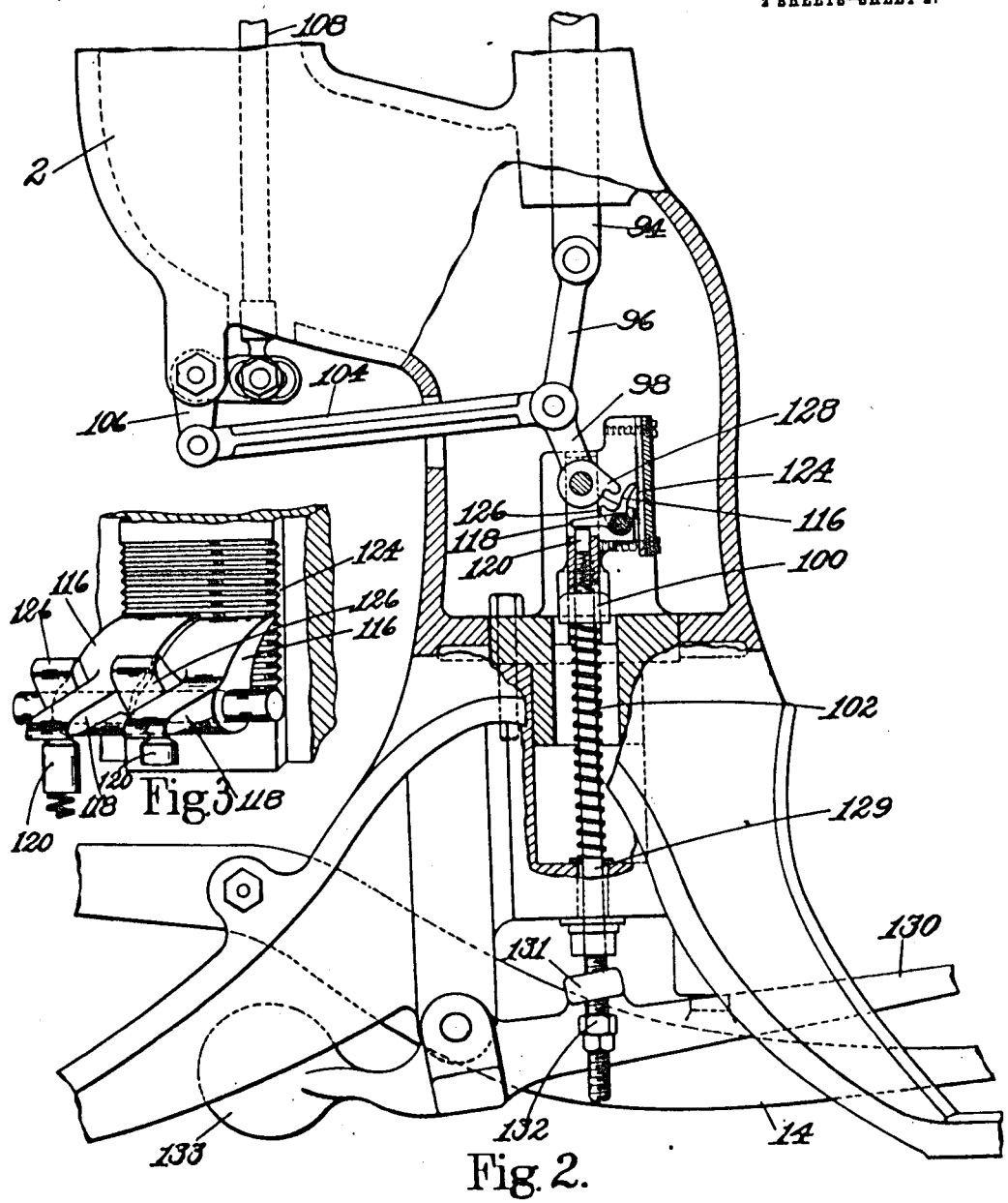

UNITED STATES PATENT OFFICE.

GEORGE GODDU, OF WINCHESTER, MASSACHUSETTS, ASSIGNOR TO UNITED SHOE MACHINERY COMPANY, OF PATERSON, NEW JERSEY, A CORPORATION OF NEW JERSEY.

WORK-SUPPORT-ACTUATING MECHANISM.

1,031,438.  Specification of Letters Patent.  Patented July 2, 1912.

Original application filed October 10, 1907, Serial No. 396,831. Divided and this application filed January 4, 1908. Serial No. 409,352.

*To all whom it may concern:*

Be it known that I, GEORGE GODDU, a citizen of the United States, residing at Winchester, in the county of Middlesex and Commonwealth of Massachusetts, have invented certain Improvements in Work-Support-Actuating Mechanisms, of which the following description, in connection with the accompanying drawings, is a specification, like reference characters on the drawings indicating like parts in the several figures.

This invention relates to mechanisms for controlling the operations of work supports and particularly to mechanisms of this type which have especial utility in machines for inserting fastenings.

In those machines for inserting fastenings which perform successive operations upon a piece of work, the work being usually automatically fed over the work support between the successive operations, it is preferable as a rule that clamping pressure be brought to bear upon the work through the work support to hold it firmly in proper position during the operation of the machine upon it and that means be provided for automatically removing the clamping pressure to permit the free feeding of the work between the successive operations.

In machines now in common use the work support is normally held in raised position by a spring, which is necessarily of considerable strength in order to withstand the force of the driver, and to permit the work to be fed the work support is depressed against the spring through mechanism operated by a cam on the driving shaft of the machine. Such an arrangement is impracticable in a high speed machine on account of the amount of power required to compress the strong spring during each cycle of the operations of the machine.

According to the present invention the work support spring will be rendered inoperative at the time the work support is to be lowered, an object of the invention being to provide means for rendering the spring inoperative, combined with means for lowering the work support, which will operate efficiently at high speed.

A further object of the invention is the provision of work support controlling means so constructed and timed as to insure a positive and uniform release of the work for the feeding operation at all speeds.

In the accompanying drawings which illustrate this invention embodied in a machine of the type disclosed in my co-pending application, Serial No. 396,831, filed October 10, 1907, for Letters Patent on an improvement in machines for inserting fastenings, of which application the present application is a division, Figure 1 is a left-hand side elevation of the machine of the above identified application provided with a work support controlling mechanism embodying the present invention; Fig. 2 is a view partly in section of the lower part of the machine showing especially the toggle mechanism for raising and lowering the work support, and Fig. 3 is a detail view drawn to a larger scale of parts shown in Fig. 2.

The machine illustrated comprises a base or standard 2 supporting a head 4 in suitable bearings in which is mounted the main driving shaft 6. A loose pulley 8 connected with any suitable source of power is adapted to be clutched to a friction pulley 10 upon the shaft 6 by any suitable clutch mechanism. A clutch controlling rod 12 is connected at one end to the clutch actuating mechanism and at the other end to a treadle 14 whereby the starting and stopping of the machine may be controlled by the foot of the operator.

For a description of the other parts illustrated, but constituting no part of the present invention, reference may be had to the co-pending application above referred to. The machine of the said co-pending application is adapted to drive loose nails, and the work upon which it operates, which is fed along by an awl between successive nail driving operations, is supported in the present construction upon a work support or horn 92 arranged to clamp the work against a work abutment 91 surrounding the point at which the nails are driven, said horn being mounted upon a vertically sliding rod 94 connected at its lower end to one link 96 of a toggle, the other link 98 of which is connected to a slide 100 mounted for vertical reciprocation in the base of the machine.

A strong spring 102, supported at one end upon a stationary part of the machine base, bears at its other end against the lower end of the slide 100. The toggle 96, 98 is adapted to be straightened and broken at each rotation of the main shaft 6 by mechanism comprising a link 104 connected to the central pivot of the toggle at one end, and at its other end connected to one arm of a bell crank 106. The other arm of the bell crank 106 is provided with a slot in which is adjustably confined a bolt connecting the lower end of the rod 108 with the bell crank 106, the upper end of said rod being connected with one arm of a second bell crank 110. The other arm of the bell crank 110 carries a cam roll which travels in an edge cam groove 112 in a cam disk 114 on the main shaft 6.

Pivotally mounted upon the slide 100 are two pawls 116, each having a rearwardly projecting portion 118 with which engages a spring-pressed plunger 120. Each pawl is adapted to engage ratchet teeth upon a stationary ratchet plate 124 mounted in the machine base adjacent to the path of movement of the slide 100. The engaging ends of the pawls 116 are slightly off-set (see Fig. 3) so that the ratchet teeth upon the ratchet plate may be very close together, one pawl only engaging one of the teeth at one time. An upwardly curved tail 126 upon each of the pawls is adapted to be engaged by a finger 128 attached to the toggle member 98 to rotate with said member about the lower pivot of the toggle. When the toggle members 96 and 98 are in the position shown in Fig. 2, that is, when the toggle is broken, the finger 128 does not engage the upturned tails of the pawls 116, and the pawls are therefore permitted to move under the action of the spring-pressed plungers 120 into engagement with the ratchet plate 124. In this position the pawls lock the slide 100 in whatever position it happens to be when the toggle is broken. When the toggle is straightened the finger 128 engages the upturned tails 126 of the pawls 116 and disengages the pawls from the ratchet plate 124. The slide 100 is then free to move under the action of the spring 102, and the toggle being straightened the movement of the slide 100 is imparted to the rod 94 and horn 92. The amount of upward movement of the horn 92 under the action of the spring 102 on the slide 100 will depend obviously upon the thickness of the work to be clamped between the horn 92 and the foot plate 91.

It will be noted that the amount of breaking movement imparted to the toggle is the same at each rotation of the main shaft. If, therefore, the slide 100 be locked at the time the toggle is broken in the position in which it rested when the toggle was straightened and when the horn engaged the under side of the work and pressed it against the foot-plate 91, the amount of releasing movement of the horn will be predetermined. The parts are so timed that this releasing movement takes place at the time the work is to be fed and for this purpose. If the feeding of the work results in bringing between the horn 92 and the foot-plate 91 a thicker portion of the work than that previously operated upon, when the toggle is again straightened the horn cannot rise as far as it did before and the slide 100 will therefore be pressed downward farther than it was before, thus compressing the spring 102.

The next work-releasing movement of the horn will, however, be the same as the last, since when the toggle is broken to move the horn downward the pawls 116 will be released by the finger 128 and will engage the ratchet plate 124 and lock the slide 100 in the new position to which it has been moved. The amount of breaking movement of the toggle being the same at each operation, as hereinbefore stated, and the slide 100 being spaced the same distance from the under side of the work at each operation, the work-releasing movement of the horn will obviously be the same for each work-feeding operation.

A rod 129, connected to the slide 100 at its upper end and surrounded at its threaded lower end with the offset portion 131 of a treadle 130, and provided with a nut 132, adjustable upon said threaded end, with which the offset portion 131 is adapted to engage, provides means by which the horn 92 may be lowered by the operator to enable him to place the work upon it or remove the work from it. The treadle 130 is provided upon the opposite side of its pivot with a counterbalancing weight 133 which keeps the treadle normally in its uppermost position. In this position of the treadle, sufficient space is provided between the offset portion 131 and the nut 132 to permit free vertical reciprocation of the rod 129 under the action of the spring 102 and the toggle 96, 98.

The machine is arranged to be stopped with the pawls 116 out of engagement with the ratchet plate 124 so that the spring 102 is causing the horn 92 to press the work against the work abutment 91. When the operator desires to remove the work he depresses the treadle 130 until its offset portion 131 engages the nut 132 upon the lower end of the rod 129 and then continues to depress it until the horn 92 is pulled down a sufficient distance to permit the removal of the work. After another piece of work has been placed upon the horn and the treadle has been released, the horn will be pressed up by spring 102 to clamp the work against the work abutment 91.

The compactness of the above described construction, the quick and positive control of the slide locking and unlocking mechanism whereby the pressure of the spring is removed from the horn in advance of the depression of the horn for the work feeding operation and again restored after said operation, and the rigidity of the parts through which the pressure of the spring is transmitted to the work when the toggle is straightened permit the effective operation of the horn actuating mechanism at very high speed.

It will be noted that the mounting of the pawls 116 upon the spring-pressed slide 100 so that they move in a path parallel to and closely adjacent to a stationary ratchet plate 124 permits of lightness and compactness of construction of these parts and contributes much to the effectiveness of the operation of the horn actuating mechanism at high speeds and it will also be noted that the small distance through which the pawls have to move about their pivots to bring them into and out of locking engagement with the ratchet plate 124 permits of a very close timing of the clamping and releasing operations controlled by the toggle and thereby avoids the necessity for extensive movements of any of the parts making up the horn actuating mechanism. It will be noted further that in this construction of horn actuating mechanism the force of the spring which operates to cause the horn to clamp the work against the work abutment is entirely restrained in advance of the work releasing movement of the horn, so that all that is required to be done by the machine in releasing the work is to break the toggle and pull the horn down, in which operation gravity obviously aids. In this respect, this mechanism differs essentially from all mechanisms in which the machine is compelled to compress a spring, or raise a weight against the action of gravity, in the work releasing operation. The removal of this customary additional load from the machine in the work releasing operation permits of the successful operation of fastening inserting machines at speeds much in excess of those attained up to the present time.

Having described my invention what I claim as new and desire to secure by Letters Patent of the United States is:—

1. In a machine of the class described, the combination with a work support, of means for causing said work support normally to clamp the work, adapted to accommodate itself to varying thicknesses, means for intermittently suspending the operation of said first-named means without disturbing the adjustment of the work support for the particular thickness clamped, and positively controlled means coöperating with said suspending means to positively lower the work support a uniform distance while the operation of said first-named means is suspended and then to positively restore said work support to the control of said first-named means.

2. In a machine of the class described, the combination with a work support, of a toggle connected at one end to said work support, a vertically adjustable slide with which the other end of said toggle is connected, means operating intermittently while the machine is in operation for positively straightening and breaking said toggle, and means carried by said slide and controlled by the angular movement of the associated member of said toggle for locking said slide at the same distance from the under side of the work after each fastening-inserting operation.

3. In a machine of the class described, the combination with a work support, of a toggle connected at one end to said work support, a vertically adjustable slide with which the other end of said toggle is connected, means operating intermittently while the machine is in operation for positively straightening and breaking said toggle, and means carried by said slide and controlled by an extension of one of the members of said toggle for locking the slide at each operation in such manner that the breaking of the toggle will cause the work support to lower the upper surface of the work the same distance at every operation.

4. In a machine of the class described, the combination with a vertically movable work support, of work support-releasing mechanism comprising a slide, means connecting said work support and said slide comprising a toggle, a locking pawl pivoted upon said slide, a stationary ratchet plate with which said pawl is adapted to engage to lock said slide in adjusted position, and means controlled by said toggle for holding said pawl out of engagement with said ratchet plate when the toggle is straightened.

5. In a machine of the class described, the combination with a vertically movable work support, a slide, a spring bearing against said slide, and means carried by said slide and coöperating with stationary means for locking said slide in different positions with said spring under different amounts of compression, of means connecting said work support and said slide comprising a toggle, means operating intermittently for automatically and positively straightening and breaking said toggle, and means controlled by said toggle for unlocking said slide when said toggle is straightened whereby the spring may operate to press the work support against the work.

6. In a machine of the class described, the combination with a work support, of work support-releasing mechanism comprising a spring-pressed slide, a stationary ratchet plate extending parallel to the path of movement of said slide, a locking pawl pivoted upon said slide and arranged to coöperate with said ratchet plate to lock said slide in adjusted position against the action of its spring, means operating to press said pawl normally into locking engagement with said plate, and positively controlled means operating against said lock in one direction of its movement and against said spring in the other direction of its movement for raising and lowering said work support while the slide is locked by said pawl, said means comprising means for unlocking said pawl when the work support comes into its raised position.

In testimony whereof I have signed my name to this specification in the presence of two subscribing witnesses.

GEORGE GODDU.

Witnesses:
H. DORSEY SPENCER,
FREDERICK L. EDMANDS.

Copies of this patent may be obtained for five cents each, by addressing the "Commissioner of Patents Washington, D. C."